(12) United States Patent
Xiang et al.

(10) Patent No.: US 9,100,852 B2
(45) Date of Patent: Aug. 4, 2015

(54) SYSTEM AND METHOD FOR NETWORK DETECTION AND SELECTION

(71) Applicant: FutureWei Technologies, Inc., Plano, TX (US)

(72) Inventors: Zhixian Xiang, Plano, TX (US); John Kaippallimalil, Richardson, TX (US); Hinghung Anthony Chan, Plano, TX (US); Khosrow Tony Saboorian, Plano, TX (US); Kaidi Huang, Chengdu (CN)

(73) Assignee: Futurewei Technologies, Inc., Plano, TX (US)

( * ) Notice: Subject to any disclaimer, the term of this patent is extended or adjusted under 35 U.S.C. 154(b) by 76 days.

(21) Appl. No.: 13/735,627

(22) Filed: Jan. 7, 2013

(65) Prior Publication Data

US 2013/0308445 A1    Nov. 21, 2013

Related U.S. Application Data

(60) Provisional application No. 61/647,287, filed on May 15, 2012, provisional application No. 61/665,712, filed on Jun. 28, 2012.

(51) Int. Cl.
| | |
|---|---|
| *H04W 28/02* | (2009.01) |
| *H04W 48/18* | (2009.01) |
| *H04W 28/08* | (2009.01) |

(52) U.S. Cl.
CPC .......... *H04W 28/0231* (2013.01); *H04W 48/18* (2013.01); *H04W 28/08* (2013.01)

(58) Field of Classification Search
CPC .......................... H04W 28/02; H04W 28/0231

USPC .......... 370/230, 235; 455/436, 525; 709/224, 709/226

See application file for complete search history.

(56) References Cited

U.S. PATENT DOCUMENTS

| | | | | |
|---|---|---|---|---|
| 2010/0323698 | A1* | 12/2010 | Rune et al. | 455/436 |
| 2011/0093845 | A1* | 4/2011 | Kwak | 717/173 |
| 2011/0138037 | A1 | 6/2011 | Sharma et al. | |
| 2012/0042076 | A1* | 2/2012 | Kawa et al. | 709/226 |
| 2012/0324100 | A1* | 12/2012 | Tomici et al. | 709/224 |

(Continued)

FOREIGN PATENT DOCUMENTS

| | | |
|---|---|---|
| CN | 101304366 A | 11/2008 |
| CN | 102395157 A | 3/2012 |

(Continued)

OTHER PUBLICATIONS

IEEE Std. 802.11u, IEEE Standard for Information Technology; Telecommunications and Information Exchange Between Systems; Local and Metropolitan Area Networks; Specific Requirements; "Part 11: Wireless LAN Medium Access Control (MAC) and Physical Layer (PHY) Specifications, Amendment 9: Interworking with External Networks," Feb. 25, 2011, IEEE, 208 pages.

(Continued)

*Primary Examiner* — Albert T Chou
(74) *Attorney, Agent, or Firm* — Slater & Matsil, LLP

(57) ABSTRACT

An embodiment method for network detection and selection includes receiving, by a user equipment (UE), a network detection and selection policy including a load threshold element, the UE further receiving load information element from an access network (AN), and applying the network detection and selection policy to the AN.

63 Claims, 6 Drawing Sheets

(56) References Cited

U.S. PATENT DOCUMENTS

2014/0080539 A1* 3/2014 Scherzer et al. .............. 455/525
2014/0089475 A1* 3/2014 Limont et al. ................ 709/221

FOREIGN PATENT DOCUMENTS

EP 2237610 A1 10/2010
WO 2006079783 A1 8/2006

OTHER PUBLICATIONS

Notification of Transmittal of the International Search Report and the Written Opinion of the INternational Searching Authority, or the Declaration received in Application No. PCT/CN2013/075652, mailed Aug. 22, 2013, 10 pages.

Extended European Search Report received in Application No. 123790227.6-1857 mailed Feb. 19, 2015, 6 pages.

* cited by examiner

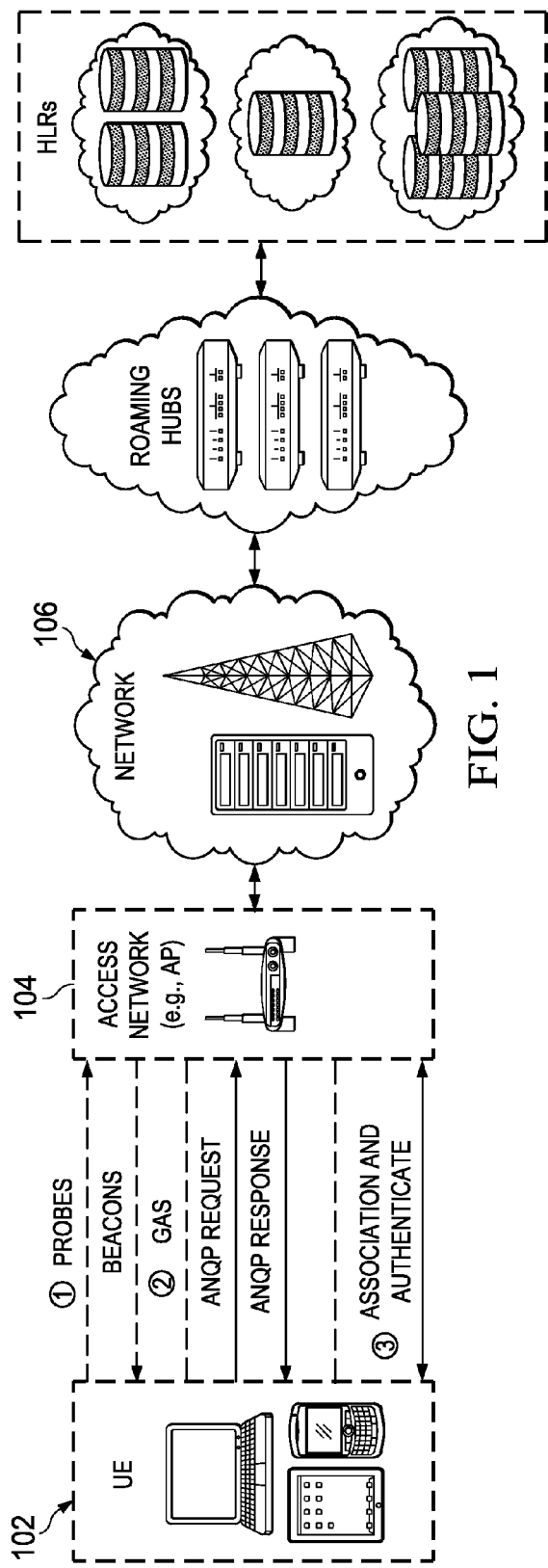
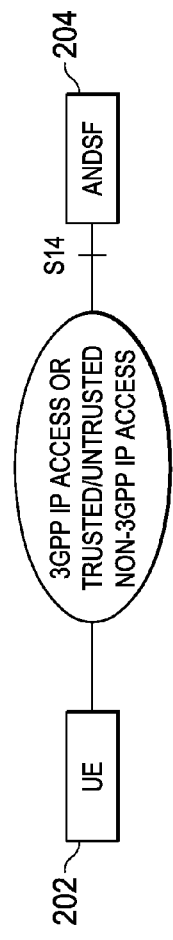

US 9,100,852 B2

SYSTEM AND METHOD FOR NETWORK DETECTION AND SELECTION

This application claims the benefit of U.S. Provisional Application No. 61/647,287, filed on May 15, 2012, entitled "System and Method for Access Network Discovery and Selection Function," which application is hereby incorporated herein by reference.

This application further claims the benefit of U.S. Provisional Application No. 61/665,712, filed on Jun. 28, 2012, entitled "System and Method for Network Selection with Quality of Service Consideration," which application is hereby incorporated herein by reference.

TECHNICAL FIELD

The present invention relates to a system and method for wireless communications, and, in particular embodiments, to a system and method for network detection and selection.

BACKGROUND

The use of wireless networks (e.g., WiFi) is becoming an important component of cellular operation to help operators meet market demand and increase their competitive edge. Cellular operators are motivated to integrate WiFi access into their existing cellular networks, and many existing mobile devices have dual mode (WiFi and cellular) connection capability. One aspect of operating a WiFi capable device is detecting and selecting an appropriate network connection. This network detection and selection technology may be facilitated through the use of various technical standards. For example, the WiFi Alliance is currently defining a Hotspot 2.0 specification to help a dual mode or WiFi-only device better select an appropriate WiFi network connection. Other standards, such as IEEE 802.11u or 3GPP may also help define mechanisms to help devices detect and select an appropriate network, such as a wireless local area network (WLAN) in a fixed network. Further, these network detection and selection technologies may be implemented via policies that may be statically pre-configured by the operator on a user equipment (UE) or dynamically set by the operator by periodically sending the UE a network detection and selection policy (e.g., an access network discovery and selection function (ANDSF) policy in a 3GPP network).

SUMMARY OF THE INVENTION

These and other problems are generally solved or circumvented, and technical advantages are generally achieved, by preferred embodiments of the present invention which are systems and methods for network detection and selection.

In accordance with an embodiment, a method for network selection includes receiving, by a user equipment (UE), a network detection and selection policy including a load threshold element, the UE further receiving a load information element associated with an access network (AN), and applying the network detection and selection policy to the AN. Applying the network detection and selection policy includes comparing the load information element with the load threshold element.

In accordance with another embodiment, a user equipment (UE) includes a processor and a computer readable storage medium storing programming for execution by the processor, the programming including instructions to receive a network detection and selection policy including a load threshold element, receive a load information element associated with an access network (AN), and apply the network detection and selection policy to the AN. The instructions to apply the network detection and selection policy includes further instructions to compare a load level indicated by the load information element with the load threshold element.

In accordance with another embodiment, setting a network selection policy includes sending, by a network device, a network detection and selection policy including a load threshold element, for use by the UE in applying the network detection and selection policy by comparing a load level indicated by a load information element associated with an access network (AN) with the load threshold element.

In accordance with another embodiment, a network device includes a processor and a computer readable storage medium storing programming for execution by the processor, the programming including instructions to send to a user equipment (UE) a network detection and selection policy including a WAN traffic load threshold, for use by the UE in applying the network detection and selection policy by comparing a load level indicated by a load information element associated with an access network (AN) with the load threshold element.

In accordance with another embodiment, a method for updating a network selection policy includes receiving, by a user equipment (UE), a network detection and selection policy including a timer, wherein the timer specifies an update interval for when the UE should next check for an updated network detection and selection policy, waiting the duration of the update interval, checking, by the UE, for an updated network detection and selection policy.

In accordance with another embodiment, a user equipment (UE) includes a processor and a computer readable storage medium storing programming for execution by the processor, the programming including instructions to receive a network detection and selection policy including a timer, wherein the timer specifies an update interval for when the UE should next check for an updated network detection and selection policy, wait the duration of the update interval; check for an updated network detection and selection policy.

In accordance with yet another embodiment, a network device includes a processor and a computer readable storage medium storing programming for execution by the processor, the programming including instructions to send a user equipment (UE) a network detection and selection policy including a policy timer, wherein the policy timer indicates an interval for when the UE should next check for an updated network detection and selection policy.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 is a flow diagram of a typical UE and network connection operation as is known in the art;

FIG. 2 is a block diagram of a UE receiving an access network discovery and selection function (ANDSF) policy as is known in the art;

DETAILED DESCRIPTION OF ILLUSTRATIVE EMBODIMENTS

Figure 3:
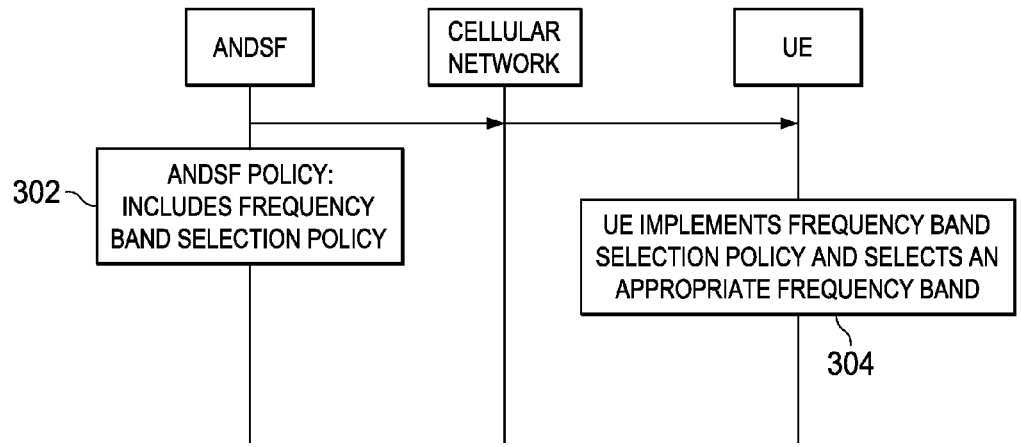
FIG. 3 is a flow diagram of a UE implementing an ANDSF policy including a frequency band selection policy according to an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

FIG. 1 illustrates typical user equipment (UE 102) and Wi-Fi network connection operation according to various standards, for example, Hotspot 2.0, IEEE802.11u, 3GPP, and the like. Various embodiments may operate according to one or several of the listed or alternate standards. When UE 102 decides to connect to a wireless network (e.g., WiFi), the UE first scans for available hotspots (i.e., access network). In FIG. 1, the access network is shown as access point (AP) 104, but the access network may be another form of access network such as a universal terrestrial radio access network (UTRAN) or an evolved UTRAN (E-UTRAN). AP 104 serves as a connection point between the UE and a network 106 (e.g., a wireless local area network (WLAN) in a fixed network or a wide area network (WAN)). Available APs may be connected to the same or multiple different networks, wherein each AP serves as a connection point to a single network. IEEE 802.11u allows for the discovery of suitable APs using an AP's generic advertisement service (GAS). GAS provides layer 2 transport of an advertisement protocol's frames between UE 102 and a server in network 106 prior to authentication. GAS allows unauthenticated UEs to determine the availability of and general information regarding a particular AP through the advertisement of certain information, such as, network 106's type (e.g., private, public, for-fee, etc.), roaming consortium, venue information, and the like. Therefore, GAS allows UE 102 to determine which APs it may potentially connect to.

UE 102 may then select a particular AP to connect to using network detection and selection policies. UE 102's operator may set these policies by periodically sending a network detection and selection policy to UE 102. For example, under 3GPP standards, an operator may set a network detection and selection policy for UE 102 using an access network discovery and selection function (ANDSF) within the operator's network.

UE 102 then gathers information about available APs and implements the network detection and selection policy set by the operator. Information gathering may be conducted over GAS using AP 104's IEEE 802.11u access network query protocol (ANQP), a query/response operation. The information provided through the ANQP typically includes the different features and available services of network 106. UE 102 may also gather information on AP 104 itself using various other control messages from AP 104 (e.g., AP 104's beacon or response probe). After UE 102 determines which AP to connect to, UE 102 carries out an authentication process, connects to an AP, and joins the AP's network. Network detection and selection policies, such as an ANDSF policy, may also set out parameters for determining when and how UE 102 changes connection to APs and/or networks.

Current network detection and selection policies (e.g., an ANDSF policy and the like) may be overly simplistic and fail to utilize the full range of available information to a UE in selecting an appropriate AN and corresponding network. Further, current methods to update network detection and selection policies may be inefficient and use unnecessary network resources.

Various embodiments are described with respect to preferred embodiments in a specific context, namely a wireless communications system operating in accordance with various Hotspot 2.0, IEEE802.11u, and/or 3GPP standards, wherein a network detection and selection policy may be implemented using a 3GPP standard (i.e., a network detection and selection policy being an ANDSF policy sent by an ANDSF server). Embodiments may also be applied, however, to other systems that may operate in accordance with a set of Hotspot 2.0, IEEE802.11u, 3GPP, or other standards, and a network detection and selection policy may be implemented according to a non-3GPP standard, such as a Hotspot 2.0 standard and the like. Embodiments may be implemented in, for example, 3GPP SA2 specification (23.402), or CT 24.402, 24.312. Furthermore, various embodiments are described with respect to connecting to wireless networks via access points, but various other forms of access networks (e.g., universal terrestrial radio access networks (UTRAN) or evolved UTRANs (E-UTRAN)) may be used to connect to a wireless network. Various embodiments may also be applied to WiFi access points (AP), access controller, ANDSF server, WiFi and cellular dual mode UEs, UEs with Hotspot 2.0 support, and the like.

FIG. 2 illustrates an example operation for setting a network detection and selection policy. The example given shows ANDSF operation as defined by 3GPP standards. However, other standards, such as Hotspot 2.0, may be used to set a network detection and selection policy. A UE 202 interacts with ANDSF 204 through an S14 interface, which allows for IP level signaling, to obtain a network detection and selection policy from the network (i.e., an ANDSF policy). The ANDSF policy sent to UE 202 may contain an inter-system routing policy (ISRP). Typically, an ISRP includes validity conditions, indicating the time frame during which the provided policy is valid. The ISRP may further include one or more filter rules for IP flow mobility and seamless offload (IFOM). These filter rules may create a prioritized list of access technologies/access networks that should be used by the UE, when available, to route traffic that matches specific IP filters on a specific access point name (APN) or on any APN. A filter rule may also identify which radio accesses are restricted for traffic that matches specific IP filters on a specific APN or on any APN (e.g., WLAN is not allowed for real-time transport protocol traffic flows on APN-x).

The current policies for AN (e.g., AP) selection may be too broadly defined and may not utilize the full extent of information made available by current standards in making an appropriate selection. For example, Hotspot 2.0 standards support multiple frequency band operation for an AN, which allows a UE to operate in one of several frequency bands supported by an AN. In current network detection and selection policy, such as ANDSF policy, there is no consideration regarding frequency band information. Therefore, the smallest granularity of current network selection is per AN, not per frequency band supported by an AN.

An embodiment increases granularity of access technology selection and allows a UE to connect to different frequency bands supported by the available ANs. A frequency band element is added to the network detection and selection policy set by an operator. This frequency band element may include the detection of available bands at an AN and create a policy for selecting a particular frequency band.

For example, FIG. 3 illustrates a flow diagram according to this embodiment applied to an ANDSF policy. A frequency band selection policy is added into a ANDSF policy (e.g., to the ANDSF's inter-system mobility policy (ISMP) and/or inter-system routing policy (ISRP)). The frequency band selection policy allows a UE to select a particular band supported by an AN. In step 302, this ANDSF policy, which includes a frequency band selection policy, is transmitted by the operator over an operator's cellular network (e.g., a long term evolution (LTE) network) to a UE. In step 304, the UE receives the policy and implements the frequency band selection policy to select a frequency band supported by available ANs.

Current network detection and selection policies may also fail to account for network traffic load. For example, IEEE 802.11u standards allow an AN (e.g., AP) to send information regarding wide area network (WAN) traffic load information through the AP's ANQP. The transmittable WAN traffic information may include WAN backhaul uplink load information, backhaul downlink load information, backhaul uplink speed, backhaul downlink speed, backhaul uplink bandwidth, backhaul downlink bandwidth, and the like. This WAN traffic load information could help improve load sharing in a network by preventing a UE from selecting a heavily-loaded network. However, current network detection and selection policy does not consider traffic load information for network selection, and specifically lacks consideration of load sharing cases. Further, current network detection and selection policies fail to properly account for situations where the UE may beneficially move to another network or to move from a wireless connection to WiFi due to its currently-associated network being overloaded.

An embodiment incorporates WAN traffic load threshold element into a network detection and selection policy (e.g., an ANDSF ISRP and/or ISMP). This traffic WAN traffic load threshold element may apply to either cellular or WLAN WAN traffic loads. The specific thresholds to be implemented are determined by operator policy, but the inclusion of a threshold may improve load sharing among networks, for example, by preventing a UE from selecting a heavily-loaded network.

Figure 4:
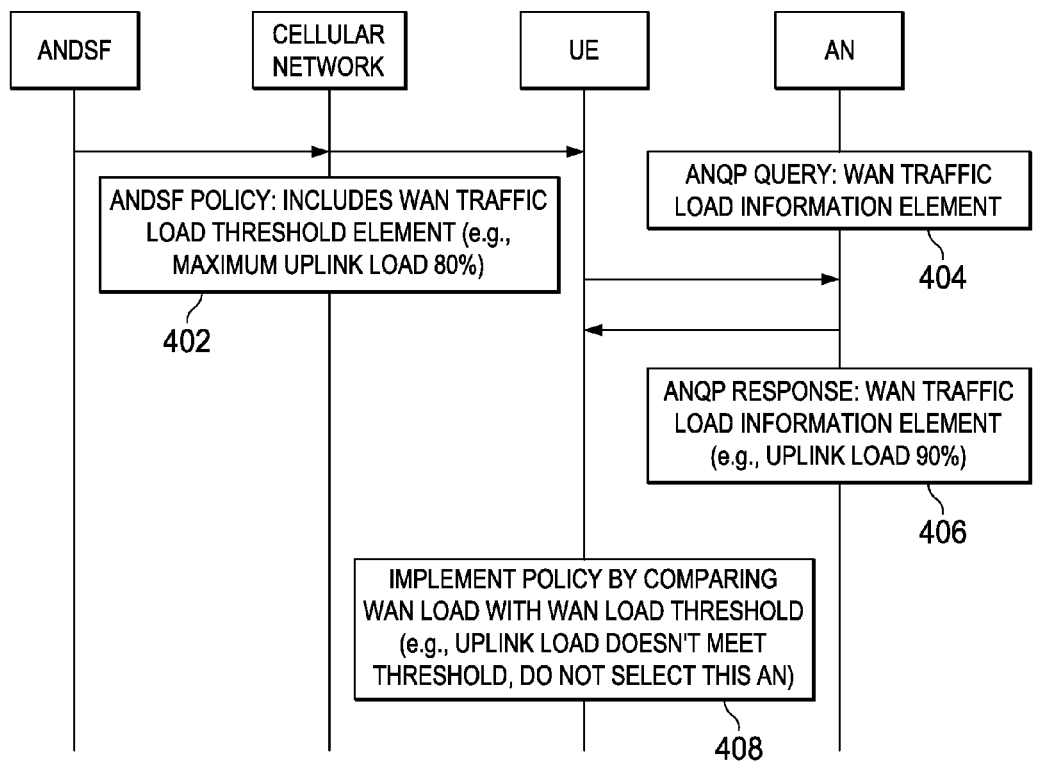
FIG. 4 is a flow diagram of a UE implementing an ANDSF policy including a WAN traffic load threshold element according to an embodiment.

FIG. 4 illustrates an embodiment of a network detection and selection policy including a WAN traffic load threshold applied to an ANDSF policy. In step 402, a network device sends an ANDSF policy including a WAN load threshold element (e.g., an element setting a maximum uplink load threshold at 80%). The network device may be an ANDSF policy server on the UE's cellular network. The WAN load threshold element may include one or more thresholds related to network load conditions, such as, an uplink load threshold, a backhaul downlink load threshold, a backhaul uplink speed threshold, a backhaul downlink speed threshold, a backhaul uplink bandwidth threshold, a backhaul downlink bandwidth threshold, and the like. Further, the network detection and selection policy may include more than one WAN load threshold element. In the example shown in FIG. 4, the ANDSF policy WAN load threshold element only sets one threshold for maximum uplink load at 80%. This ANDSF policy is sent over the cellular network by an operator and received by a UE.

In steps 404 and 406, the UE uses an ANQP query/response to receive a WAN traffic load information element from an AN. The AN may be an WiFi AP or some other form of AN (e.g., a UTRAN, or an E-UTRAN). This WAN traffic load information element may indicate a wide range of information related to the WAN traffic load level. For example, the WAN traffic load information may inform the UE that the WAN uplink load at the AN is at 90%. The UE then implements the ANDSF policy in step 408 by comparing the WAN load level with the WAN load threshold. Because the uplink load does not meet the threshold (actual uplink load is at 90%, which is greater than the 80% threshold), the UE determines that the AN should not be selected. The numbers in this example are for illustrative purposes only; the particulars as to the number and types of thresholds set in a network detection and selection policy depends the operator's preferences.

The inclusion of a WAN traffic load threshold in a network detection and selection policy allows the UE to determine which ANs are appropriate candidates for selection. An AN's traffic load meeting a threshold does not necessarily require the UE to select the AN. Other considerations set by the network detection and selection policy may still apply. The threshold merely acts to create a list of potential candidate ANs the UE could select. In an alternative embodiment, the WAN traffic load threshold may also act as a trigger point for when the UE should decide to change to join an alternative network because the network the UE is currently associated with has become overloaded.

In an alternative embodiment, the UE may need to calculate the WAN traffic load level for comparison against a WAN traffic load threshold. For example, the network detection and selection policy may contain a minimum available WAN backhaul bandwidth threshold. However, the WAN traffic load information element sent by the AN may not include information regarding WAN backhaul bandwidth. The AN may instead send the UE information regarding WAN throughput. The UE may calculate the appropriate WAN bandwidth load level associated with the AN using known equations and the information received regarding WAN throughput. In an embodiment, calculating the WAN bandwidth load level includes predicting and expected WAN bandwidth load level. The UE may then use the calculated WAN bandwidth load level to compare against the threshold.

Further, current network detection and selection policies fail to account for available air-interface load information. An AN may provide information on the air-interface load, for example, via its beacon or probe response. The AN may be an WiFi AP or some other form of AN (e.g., a UTRAN, or an E-UTRAN). According to IEEE 802.11-2007 standards, the AN can include the basic service set (BSS) load information element on its beacon or probe response. This air-interface load element may include information about the number of UEs currently associated with this AN, the channel utilization percentage (percentage of time the AN sensed it was busy), and the remaining admission control time that may be allocated to a UE. This air-interface load information may indicate the applicable quality of service (QoS) for a UE if it connects to the AN. Currently, network detection and selection policy (e.g. ANDSF ISRP/ISMP policy) does not consider air-interface information for network selection.

An embodiment provides for a network detection and selection policy including an air-interface load threshold element. This enhanced network detection and selection policy provides better AN/network selection by setting air-interface load thresholds for a UE. The air-interface load threshold may be a BSS load threshold, an air-interface QoS threshold, a number of user equipment (UE) associated with an AN threshold; a channel utilization percentage of an AN threshold, a remaining admission control time available to a UE threshold, etc. The inclusion of this threshold may allow UEs to only select an AN that can support an appropriate load level.

An alternative embodiment includes air-interface load thresholds with an evaluation period in a network detection and selection policy for air-interface load evaluation. Evaluation periods may be implemented to avoid a ping pong situation (i.e., when an UE wants to connect to multiple ANs at the same time). The evaluation period sets up a time frame for considering applicable air-interface load information when applying the policy. Air-interface load information outside of the time frame would not be considered. For example, a network detection and selection policy with an evaluation period may require a UE to compare the air-interface load threshold with the averaged BSS load values during the evaluation period from an AN.

Figure 5A:
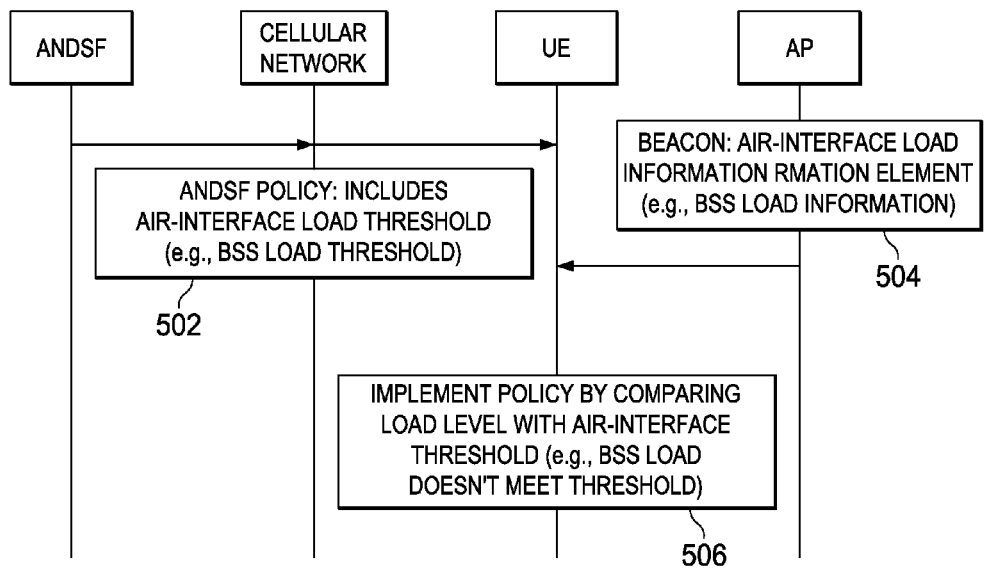
FIGS. 5A and 5B are flow diagrams of a UE implementing an ANDSF policy including an air-interface load threshold element according to various embodiments.
Figure 5B:
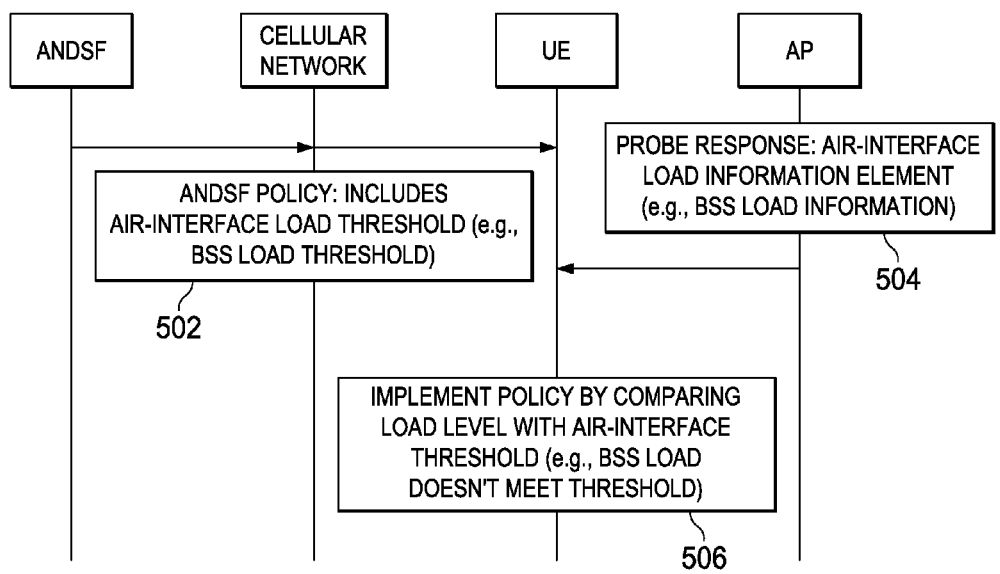

FIGS. 5A and 5B illustrate an embodiment of a network detection and selection policy including air-interface load thresholds applied to an ANDSF policy and an AP. In step 502, a network device sends an ANDSF policy including an air-interface load threshold element (e.g., setting a BSS load threshold). This ANDSF policy is sent by an operator over their cellular network and received by a UE.

In step 504, the UE uses an AP's beacon (illustrated in FIG. 5A) or response probe (illustrated in FIG. 5B) to receive an air-interface load information element. For example, in FIGS. 5A and 5B, this air-interface load information element is a BSS load information element. As previously discussed, the BSS load information element may inform the UE about the number of UEs currently associated with the AP, the AP's channel utilization percentage, and the AP's remaining admission control time. The UE then implements the ANDSF policy in step 506 by comparing the BSS load level indicated by the BSS load information element with the BSS load threshold element. If the BSS load level does not meet the threshold, the UE determines that the AP should not be selected.

Figure 6:
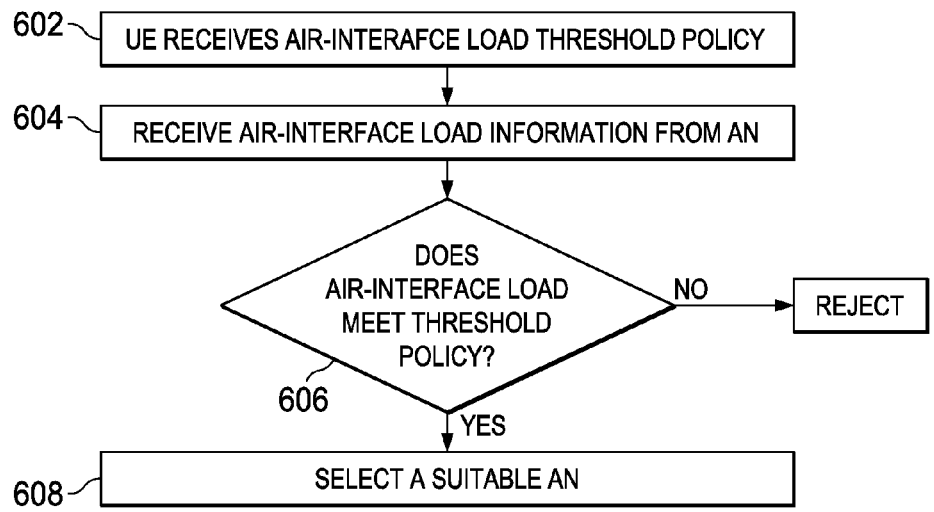
FIG. 6 is a flow diagram of a UE implementing an ANDSF policy including an air-interface load threshold element according to an embodiment.

FIG. 6 illustrates an embodiment of UE operation for implementing a network detection and selection policy including an air-interface load threshold applied to an ANDSF policy. In step 602, the UE receives an ANDSF with an air-interface load threshold such as the air-interface load thresholds described above. In step 604, the UE receives air-interface load information from an AN. This information may be received as an air-interface load information element such as a BSS load information element. In step 606, the UE evaluates if the air-interface load level indicated by the air-interface load information meets the air-interface load threshold from the ANDSF policy. If the load level doesn't meet the threshold, the UE rejects the AN as a suitable connection point, otherwise, in step 608, the UE may select the AN.

Figure 7:
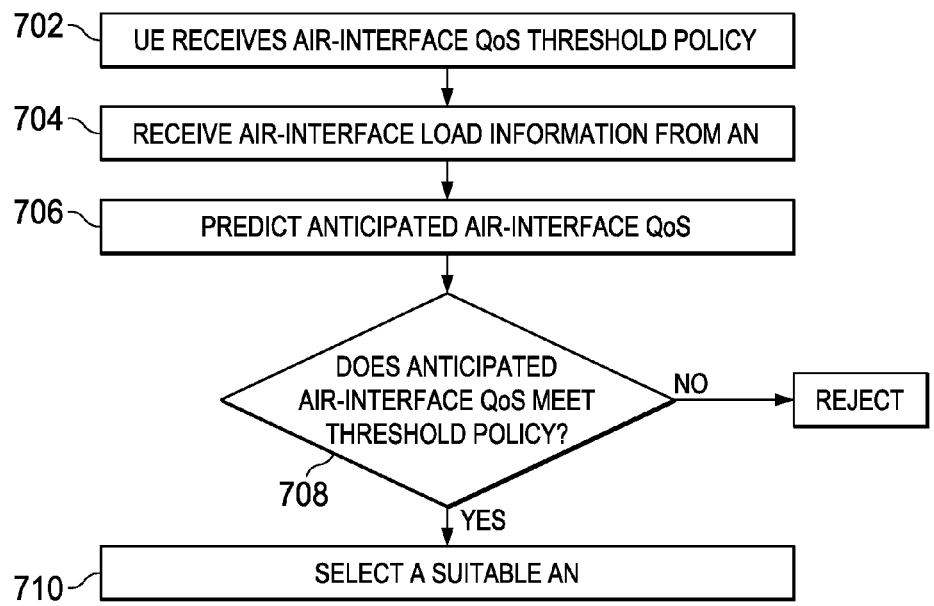
FIG. 7 is a flow diagram of a UE implementing an ANDSF policy including an air-interface quality of service (QoS) threshold element according to an embodiment.

FIG. 7 illustrates an example flow diagram for network detection and selection policy enhancement with QoS consideration as applied to an ANDSF policy. In step 702, the UE's operator provides an ANDSF policy comprising an air-interface QoS threshold (e.g., support best effort traffic) to the UE. In step 704, the AN provides an air-interface load information element to the UE using, for example, the AN's beacon or response probe. As discussed above, the air-interface load information element may be a BSS load information element. In step 706, the UE calculates the expected QoS level that would apply to the UE if it selected the AN using information on the air-interface load information element. For example, the UE calculates that the AN can only support background traffic, which is lower than best effort traffic. In an embodiment, calculating the expected QoS level would include predicting an expected QoS level. The UE therefore decides this AN is not suitable and selects another network. On the other hand, if the UE calculates the AN can support best effort traffic (i.e., the threshold is met), then in step 710 the UE may decide to select this network.

The inclusion of an air-interface load threshold element in a network detection and selection policy allows the UE to determine which ANs are appropriate candidates for selection. As in the case regarding WAN threshold elements, meeting the threshold does guarantee the UE will select the AN because other considerations set by the network detection and selection policy may still apply. The threshold merely acts to create a list of potential candidate ANs the UE could select. In an alternative embodiment, the air-interface load threshold may also act as a trigger point for when the UE should decide to change to join an alternate AN (or join an alternate network) because the AN the UE is currently associated with can no longer support a desired air-interface load.

Figure 8:
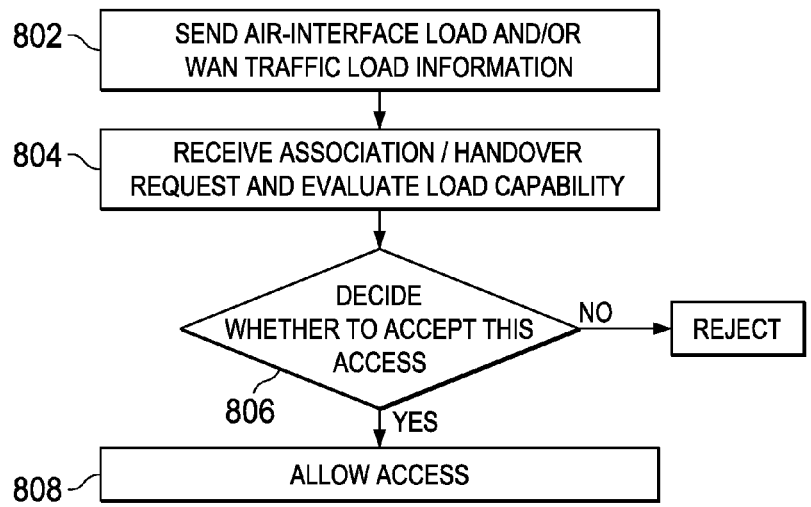
FIG. 8 is a flow diagram of a network implementing a threshold element according to an embodiment.

FIG. 8 illustrates an alternative embodiment, wherein the various threshold elements are implemented on the wireless network side. In step 802, an AN sends a WAN traffic load information element and/or an air-interface load information element to a UE attempting to connect to the network. In step 804, the AN receives an association/handover request from the UE, and the network evaluates its load capabilities. This evaluation may be implemented through setting certain WAN traffic load or air-interface load thresholds on the network side. In step 806, if the network determines that it is currently overloaded, it denies the connection request from the UE. However, if the network determines it has the load capacity for the UE, it allows the association/hand over request and connection process to proceed.

Figure 9:
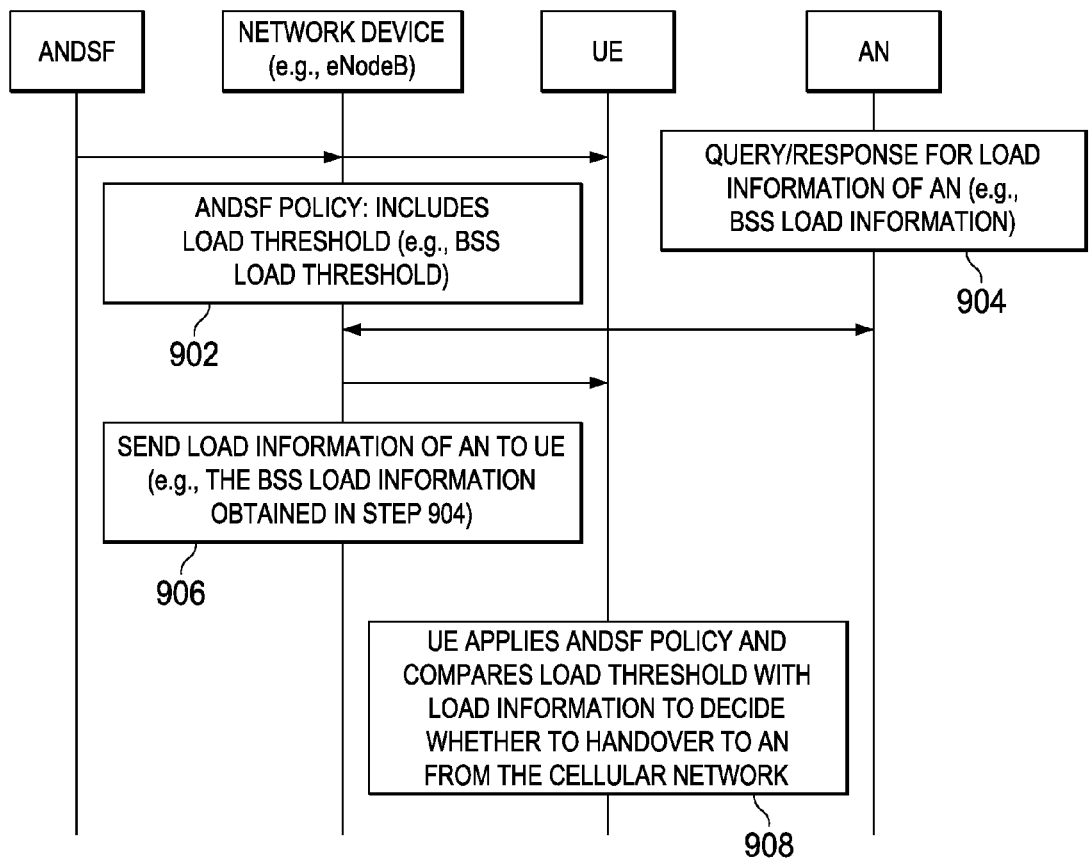
FIG. 9 is a flow diagram of a UE implementing an ANDSF policing including a load threshold element according to an embodiment.

FIG. 9 illustrates an alternate embodiment where the UE receives load information (e.g., WAN traffic load information or air-interface load information) from an eNodeB associated with the cellular network the UE is connected to. In step 902, a cellular operator sends a network detection and selection policy (e.g., an ANDSF policy) via a network device (e.g., an eNodeB) to a UE. The network detection and selection policy includes a load threshold element (e.g., a WAN traffic load threshold or an air-interface load threshold). For example, in FIG. 9, the network detection and selection policy sets a BSS load threshold. In step 904, the network device obtains load information from an AN (e.g., an AP) available to the UE using a query/response protocol of the AN. In FIG. 9, the eNodeB receives BSS load information, although other kinds of load information such as WAN traffic load information or air-interface load information may be obtained as well. In step 906, the eNodeB then sends the load information relating to the AN to the UE. In step 908, the UE applies the ANDSF policy and compares the load threshold with the load information to determine whether to select the AN. For example, if the UE determines the load level indicated by the load information does not meet the load threshold, then the UE may decide to select an alternate AN or remain on the cellular network.

Typically, there are two ways for the policy to be sent to a UE: push mode (where the network pushes policy to the UE) or pull mode (where the UE requests policy from network). Due to push methods being dependent on network server implementation, which may be unsuitable for moving UEs, pull methods are more practical and generally preferred. An aspect of implementing a pull method is the synchronization of a UE with the network server to obtain the latest policy. For example, current 3GPP 24.312 standards define an update policy indication for a UE to determine whether or not to request an ANDSF policy update. A problem with this approach is the network server does not know what policy is the UE currently uses and what updates are needed. In some cases, a UE may only require a portion of its policy to be updated, instead of the entire policy. An embodiment creates a new policy indication and procedure associated with updating network detection and selection policies.

Figure 10:
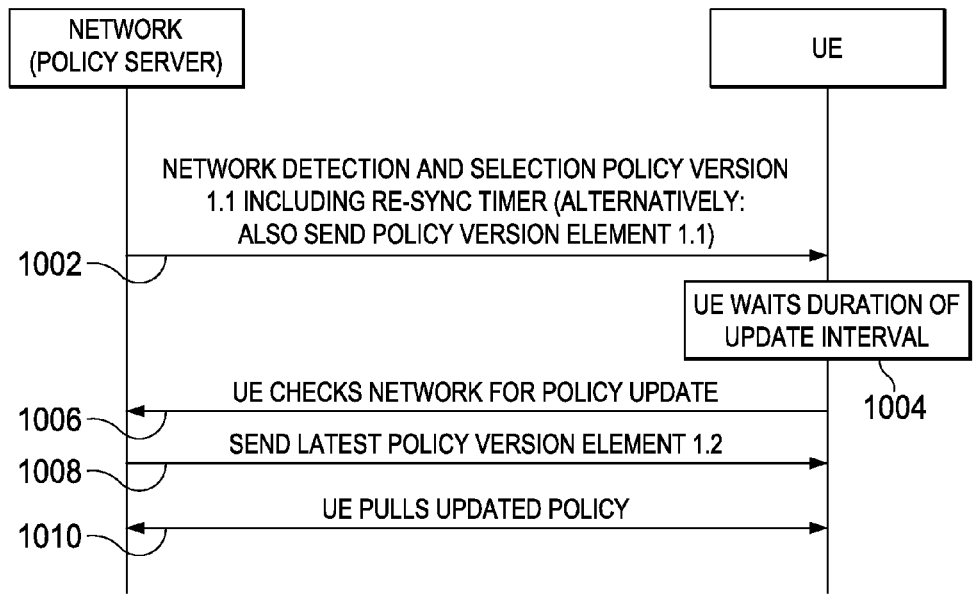
FIG. 10 is a flow diagram of a UE updating a network detection and selection policy according to an embodiment.

FIG. 10 illustrates an embodiment including a re-sync timer element in a network detection and selection policy (e.g., an ANDSF ISRP/ISMP). In step 1002, the network sends a network detection and selection policy version 1.1 including a re-sync timer. The re-sync timer acts as a trigger for UE to re-sync its policy with the network. The re-sync timer has an update interval element which sets when the UE should next check the network for an updated network detection and selection policy. In step 1004, the UE waits the duration of the update interval, and in step 1006, the UE checks the network for an updated network detection and selection policy.

An embodiment further includes in step 1002, wherein the UE receives a policy version element along with the network detection and selection policy from the network that indicates the current existing policy at the UE (version 1.1). In step 1008, when the UE checks for an updated policy, the network may send a latest policy version element to the UE indicating the most current network detection and selection policy known to the network (version 1.2). The UE uses the latest policy version element returned by network to compare against the existing policy version element to determine if an update is needed. Because version 1.2 is fresher than version 1.1, in step 1010, the UE pulls the latest network detection and selection policy (version 1.2) from the network. In an alternative embodiment, the UE may also use the policy version element to determine which portions of its policy is outdated, triggering the UE to only pull those portions of the updated policy that are different from the exiting policy at the UE.

Alternatively, if the latest policy version element indicates the latest policy is not fresher than the current policy at the UE (not shown), the UE determines no update is needed. The UE may then wait the duration of the update interval to check for an updated policy again. If no update is needed again (i.e., the latest policy version element indicates that the policy has not been updated), the UE waits the duration of the update interval and then checks for a policy update. In an iterative process, the UE may constantly check the network for an updated policy after an update interval until the UE determines an update is needed.

In alternative embodiment, the policy version element may also be used by the network to determine whether to push a new policy to the UE. Further, based on the UE's query, the network may only push the portion of the policy that differs from the existing policy at the UE.

Figure 11:
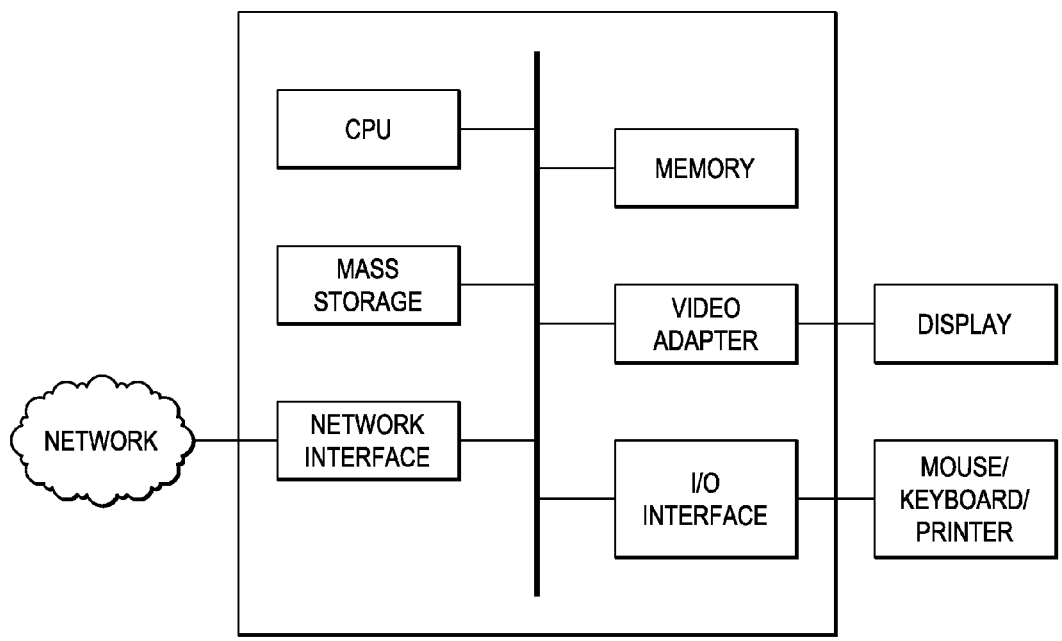
FIG. 11 is a block diagram illustrating a computing platform that may be used for implementing, for example, the devices and methods described herein, in accordance with an embodiment.

FIG. 11 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety:
IEEE 802.11-2007.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method for network selection comprising:
receiving, by a user equipment (UE), a network detection and selection policy comprising a load threshold ele- ment, wherein the load threshold element comprises a wide area network (WAN) backhaul load threshold;
receiving, by the UE, a load information element associated with an access network (AN), wherein the load information element comprises WAN backhaul load information; and
applying the network detection and selection policy to the AN, wherein applying the network detection and selection policy comprises:
comparing a load level indicated by the load information element with the load threshold element; and
determining whether the load level is higher than a load threshold set by the load threshold element.

2. The method of claim 1, wherein receiving, by the UE, the traffic load information element comprises using an access network query protocol of the AN to obtain the traffic load information element.

3. The method of claim 1, further comprising calculating the load level, by the UE, using the traffic load information element.

4. The method of claim 1, wherein the traffic load information element includes WAN backhaul uplink load information, backhaul downlink load information, backhaul uplink speed information, backhaul downlink speed information, backhaul uplink bandwidth information, backhaul downlink bandwidth information, or a combination thereof.

5. The method of claim 1, wherein the load threshold element further comprises an air-interface load threshold element and the load information element further comprises an air-interface load information element.

6. The method of claim 5, wherein the air-interface load threshold element is a basic service set (BSS) load threshold element and the air-interface load information element is a basic service set (BSS) load information element.

7. The method of claim 5, wherein the air-interface threshold element is an air-interface quality of service (QoS) threshold element and wherein the load level indicated by the air-interface load information element is an expected air-interface QoS to the UE at the AN calculated from the air-interface load information element.

8. The method of claim 5, wherein the air-interface load information element comprises information on a number of UEs associated with the AN, a channel utilization percentage of the AN, a remaining admission control time available to the UE, or a combination thereof.

9. The method of claim 5, wherein receiving, by the UE, the air-interface load information element comprises using a beacon or probe response frame of the AN to obtain the air-interface load information element.

10. The method of claim 5, wherein the network detection and selection policy further comprises an air-interface load threshold evaluation period, and wherein applying the network detection and selection policy to the AN comprises applying the network detection and selection policy during the air-interface load threshold evaluation period.

11. The method of claim 1, wherein the network detection and selection policy is an access network discovery and selection function policy.

12. The method of claim 1, wherein the load threshold element sets a minimum load threshold, a maximum load threshold, or a combination thereof.

13. The method of claim 1, wherein applying the network detection and selection policy further comprises selecting the AN when the load level indicated by the load information element meets the load threshold element.

14. The method of claim 1, wherein applying the network detection and selection policy further comprises adding the AN to a list of candidate ANs suitable for selection when the load level indicated by the load information element meets the load threshold element.

15. The method of claim 1, wherein applying the network detection and selection policy further comprises not selecting the AN when the load level indicated by the load information element does not meet the load threshold element.

16. The method of claim 1, wherein the AN is an AN the UE is currently connected to, and applying the network detection and selection policy further comprises the UE disconnecting from the AN and connecting to a different AN when the load level indicated by the load information element does not meet the load threshold element.

17. The method of claim 1, wherein the access network is an access point, a universal terrestrial radio access network (UTRAN), or an evolved UTRAN.

18. A user equipment (UE) comprising:
a processor; and
a computer readable storage medium storing programming for execution by the processor, the programming including instructions to:
receive a network detection and selection policy comprising a load threshold element, wherein the load threshold element comprises a wide area network (WAN) backhaul load threshold;
receive a load information element associated with an access network (AN), wherein the load information element comprises WAN backhaul load information; and
apply the network detection and selection policy to the AN, wherein the instructions to apply the network detection and selection policy includes further instructions to:
compare a load level indicated by the load information element with the load threshold element; and
determine whether the load level is higher than a load threshold set by the load threshold element.

19. The UE of claim 18, wherein the instructions to apply the network detection and selection policy includes further instructions to connect to the AN if the load level indicated by the load information element meets the load threshold element.

20. The UE of claim 18, wherein the instructions to apply the network detection and selection policy includes further instructions to add the AN to a list of candidate ANs suitable for connection when the load level indicated by the load information element meets the load threshold element.

21. The UE of claim 18, wherein the instructions to apply the network detection and selection policy includes further instructions to not connect to the AN if the load level indicated by the load information element does not meet the load threshold element.

22. The UE of claim 18, wherein the AN is an AN the UE is currently connected to, and the instructions to apply the network detection and selection policy includes further instructions to disconnect from the AN and connect to a different AN when the load level indicated by the load information element does not meet the load threshold element.

23. The UE of claim 18 wherein the load level indicated by the traffic load information element is the load level calculated, by the UE, using the traffic load information element.

24. The UE of claim 18 wherein the traffic load information element comprises WAN backhaul uplink load information, backhaul downlink load information, backhaul uplink speed information, backhaul downlink speed information, backhaul uplink bandwidth information, backhaul downlink bandwidth information, or a combination thereof.

25. The UE of claim 18, wherein the load threshold element further comprises an air-interface load threshold element and the load information element further comprises an air-interface load information element.

26. The UE of claim 25, wherein the air-interface load threshold element is a basic service set (BSS) load threshold element and the air-interface load information element is a BSS load information element.

27. The UE of claim 25, wherein the air-interface load threshold element is an air-interface quality of service (QoS) threshold element, and wherein an air-interface load level indicated by the air-interface load information element is an expected air-interface QoS to the UE at the AN calculated from the air-interface load information element.

28. The UE of claim 25, wherein the network detection and selection policy further comprises an air-interface load threshold evaluation period and wherein the instructions to apply the network detection and selection policy comprises instructions to apply the network detection and selection policy during the air-interface load threshold evaluation period.

29. The UE of claim 25, wherein the information on the air-interface load information element comprises information on a number of UEs connected to the AN, a channel utilization percentage of the AN, an available admission control time to the UE, or a combination thereof.

30. The UE of claim 18, wherein the network detection and selection policy is an access network discovery and selection function policy.

31. The UE of claim 18, wherein the load threshold comprises a minimum threshold, a maximum threshold, or a combination thereof.

32. The UE of claim 18, wherein the AN is an access point, a universal terrestrial radio access network (UTRAN), or an evolved UTRAN.

33. A method for setting a network selection policy comprising sending, by a network device, a network detection and selection policy to a user equipment (UE), the network detection and selection policy comprising a load threshold element, for use by the UE in applying the network detection and selection policy by comparing the load threshold element with a load level indicated by a load information element associated with an access network (AN) and determining whether the load level is higher than a load threshold set by the load threshold element, wherein the load threshold element comprises a wide area network (WAN) backhaul load threshold, and wherein the load information element comprises WAN backhaul load information.

34. The method of claim 33, wherein the network detection and selection policy is an access network discovery and selection function policy.

35. The method of claim 33, further comprising sending, by a device, the load information element to the UE, wherein the device is an access point, an eNodeB, a universal terrestrial radio access network (UTRAN), or an evolved UTRAN.

36. The method of claim 33, wherein the traffic load threshold element comprises a WAN backhaul uplink load threshold, a backhaul downlink load threshold, a backhaul uplink speed threshold, a backhaul downlink speed threshold, a backhaul downlink bandwidth threshold, a backhaul uplink bandwidth threshold, or a combination thereof.

37. The method of claim 33, wherein the load threshold element further comprises an air-interface load threshold element and the load information element further comprises an air-interface load information element.

38. The method of claim 37, wherein the network detection and selection policy further comprises an air-interface load threshold evaluation period.

39. The method of claim 37, wherein the air-interface load threshold element is a basic service set (BSS) load threshold element.

40. The method of claim 37, wherein the air-interface load threshold element is an air-interface quality of service (QoS) threshold element.

41. The method of claim 37, wherein the air-interface load threshold element comprises a number of user equipment (UE) associated with an AN threshold, a channel utilization percentage of the AN threshold, a remaining admission control time available to a UE threshold, or a combination thereof.

42. The method of claim 33, wherein the network detection and selection policy is an access network discovery and selection function policy.

43. The method of claim 33, wherein the load threshold element comprises a minimum threshold, a maximum threshold, or a combination thereof.

44. The method of claim 33, wherein applying the network detection and selection policy further comprises selecting the AN when the load level indicated by the load information element meets the load threshold element.

45. The method of claim 33, wherein applying the network detection and selection policy further comprises adding the AN to a list of candidate ANs suitable for selection when the load level indicated by the load information element meets the load threshold element.

46. The method of claim 33, wherein applying the network detection and selection policy further comprises not selecting the AN when the load level indicated by the load information element does not meet the load threshold element.

47. The method of claim 33, wherein the AN is an AN the UE is currently connected to, and applying the network detection and selection policy further comprises the UE disconnecting from the AN and connecting to a different AN when the load level indicated by the load information element does not meet the load threshold element.

48. A network device comprising:
a processor; and
a computer readable storage medium storing programming for execution by the processor, the programming including instructions to send a network detection and selection policy to a user equipment (UE), the network detection and selection policy comprising a load threshold element, for use by the UE in applying the network detection and selection policy by comparing a load level indicated by a load information element associated with an access network (AN) with the load threshold element and determining whether the load level is higher than a load threshold set by the load threshold element, wherein the load threshold element comprises a wide area network (WAN) backhaul load threshold, and wherein the load information element comprises WAN backhaul load information.

49. The network device of claim 48, wherein the network detection and selection policy is an access network discovery and selection function policy.

50. The network device of claim 48, wherein the load information element is sent to the UE by an access point, an evolved NodeB, a universal terrestrial radio access network (UTRAN), or an evolved UTRAN.

51. The network device of claim 48, wherein the load threshold element further comprises an air-interface load threshold element and the load information element further comprises an air-interface load information element.

52. The network device of claim 43, wherein the network detection and selection policy further comprises an air-interface load threshold evaluation period.

53. The network device of claim 48, wherein applying the network detection and selection policy further comprises selecting the AN when the load level indicated by the load information element meets the load threshold element.

54. The network device of claim 48, wherein applying the network detection and selection policy further comprises adding the AN to a list of candidate ANs suitable for selection when the load level indicated by the load information element meets the load threshold element.

55. The network device of claim 48, wherein applying the network detection and selection policy further comprises not selecting the AN when the load level indicated by the load information element does not meet the load threshold element.

56. The network device of claim 48, wherein the AN is an AN the UE is currently connected to, and applying the network detection and selection policy further comprises the UE disconnecting from the AN and connecting to a different AN when the load level indicated by the load information element does not meet the load threshold element.

57. A method for updating a network selection policy comprising:
receiving, by a user equipment (UE), a network detection and selection policy comprising an air-interface load threshold evaluation period and a timer, wherein the timer specifies an update interval for when the UE should next check for an updated network detection and selection policy;
applying, by the UE, the network detection and selection policy during the air-interface load threshold evaluation period to select an access network (AN), wherein air-interface load information outside of the evaluation period is not considered;
waiting a duration of the update interval; and
checking, by the UE, for an updated network detection and selection policy.

58. The method of claim 57, wherein the network detection and selection policy is an access network discovery and selection function policy.

59. The method of claim 57, further comprising:
receiving, by the UE, an existing policy version element; and
after checking, by the UE, for the updated network detection and selection policy:
receiving, by the UE, a response comprising an updated policy version element;
comparing the updated policy version element with the existing policy version element; and
pulling, by the UE, a portion of an updated network detection and selection policy, wherein the portion of the updated network detection and selection policy corresponds to a difference found by comparing the updated policy version element and the existing policy version element.

60. A user equipment (UE) comprising:
a processor; and
a computer readable storage medium storing programming for execution by the processor, the programming including instructions to:
receive a network detection and selection policy comprising an air-interface load threshold evaluation period and a timer, wherein the timer specifies an update interval for when the UE should next check for an updated network detection and selection policy
apply the network detection and selection policy during the air-interface load threshold evaluation period to select an access network (AN), wherein air-interface load information outside of the evaluation period is not considered;
wait a duration of the update interval; and
check for an updated network detection and selection policy.

61. The UE of claim 60, wherein the network detection and selection policy is an access network discovery and selection function policy.

62. The UE of claim 60, wherein the programming includes further instruction to:
receive, by the UE, an existing policy version element; and
after the instruction to check for the updated network detection and selection policy:
receive a response comprising an updated policy version element;
compare the updated policy version element with the existing policy version element; and
pull a portion of an updated network detection and selection policy, wherein the portion of the updated network detection and selection policy corresponds to a difference found by comparing the updated policy version element and the existing policy version element.

63. A network device comprising:
a processor; and
a computer readable storage medium storing programming for execution by the processor, the programming including instructions to send to a user equipment (UE) a network detection and selection policy comprising an air-interface load threshold evaluation period and a policy timer, wherein the policy timer indicates an interval for when the UE should next check for an updated network detection and selection policy, and wherein the network detection and selection policy is applied, by the UE, during the air-interface load threshold evaluation period to select an access network (AN), wherein air-interface load information outside of the evaluation period is not considered.

* * * * *

UNITED STATES PATENT AND TRADEMARK OFFICE
CERTIFICATE OF CORRECTION

PATENT NO. : 9,100,852 B2  
APPLICATION NO. : 13/735627  
DATED : August 4, 2015  
INVENTOR(S) : Xiang et al.

Page 1 of 1

It is certified that error appears in the above-identified patent and that said Letters Patent is hereby corrected as shown below:

In the claims

Col. 15, line 3, claim 52, delete "claim 43" and insert --claim 51--.

Signed and Sealed this
Eighth Day of December, 2015

Michelle K. Lee
*Director of the United States Patent and Trademark Office*